O. M. & S. E. FRIEND.
WHEAT CLEANING MACHINE.
APPLICATION FILED OCT. 6, 1913.
1,136,596.
Patented Apr. 20, 1915.
2 SHEETS—SHEET 1.
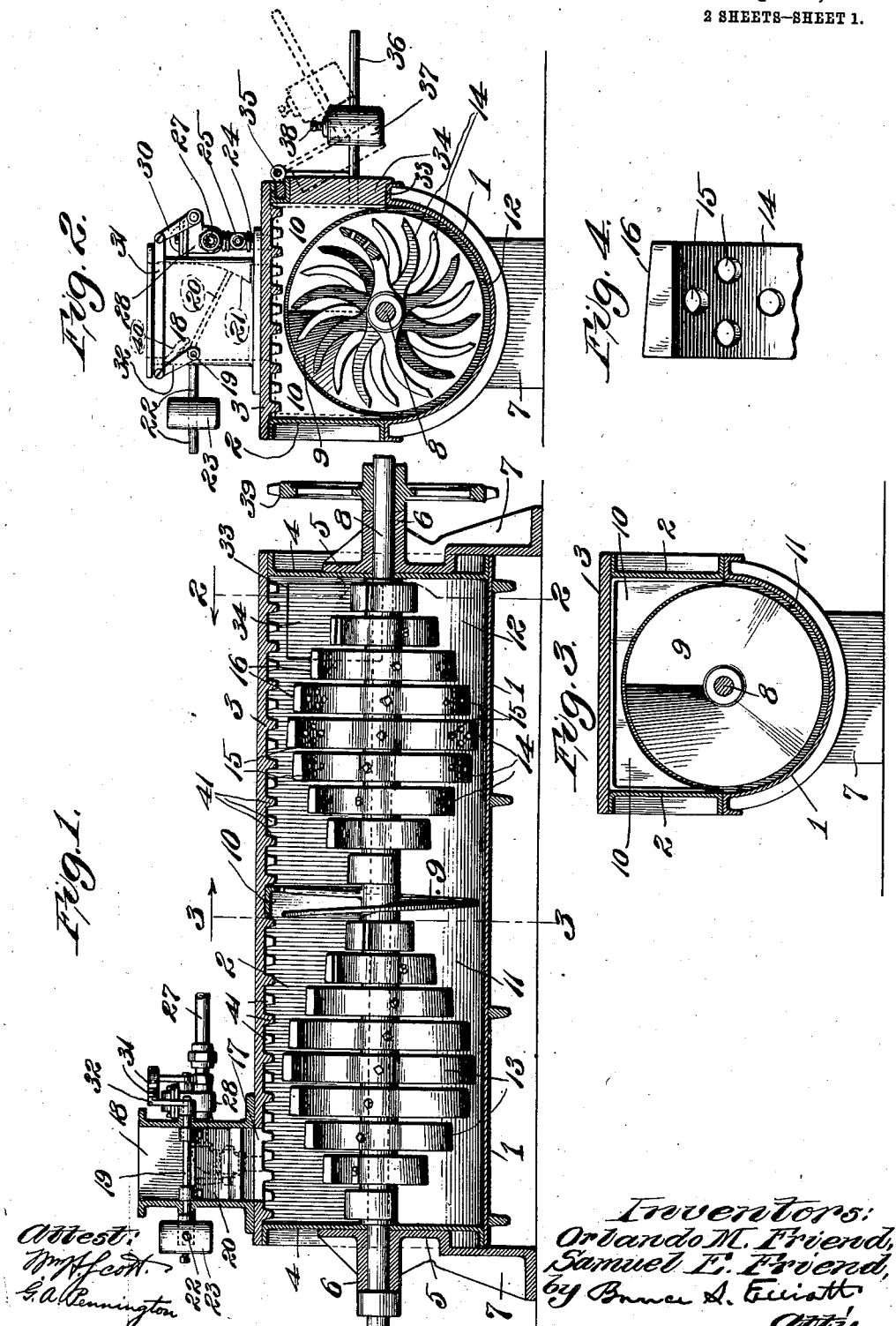

O. M. & S. E. FRIEND.
WHEAT CLEANING MACHINE.
APPLICATION FILED OCT. 6, 1913.
1,136,596.
Patented Apr. 20, 1915.
2 SHEETS—SHEET 2.
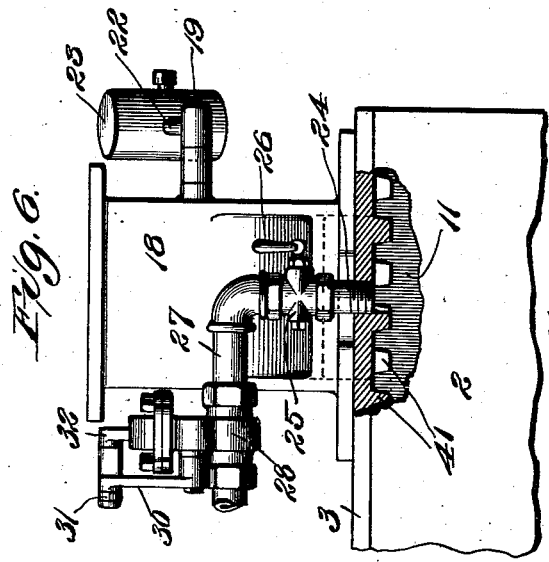
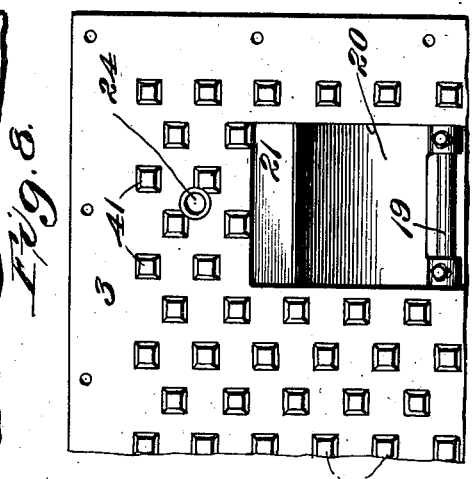
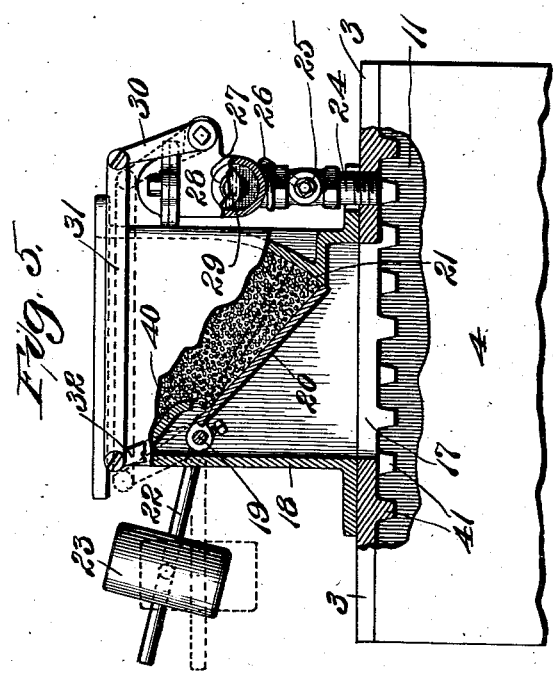
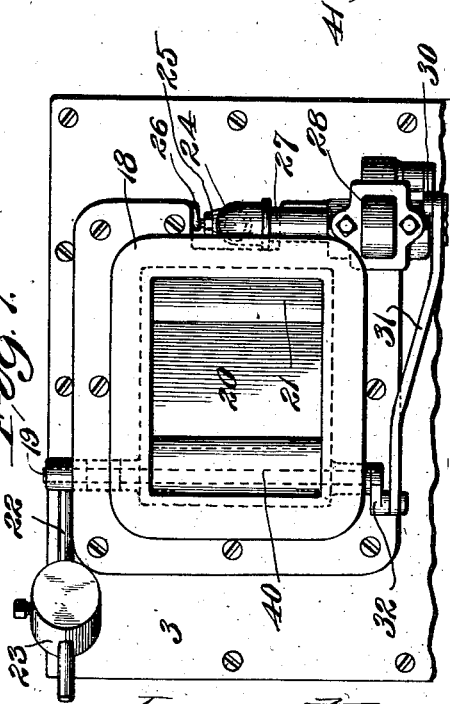

UNITED STATES PATENT OFFICE.

ORLANDO M. FRIEND AND SAMUEL E. FRIEND, OF HANNIBAL, MISSOURI.

WHEAT-CLEANING MACHINE.

1,136,596. Specification of Letters Patent. Patented Apr. 20, 1915.

Application filed October 6, 1913. Serial No. 793,541.

*To all whom it may concern:*

Be it known that we, ORLANDO M. FRIEND and SAMUEL E. FRIEND, citizens of the United States, residing at Hannibal, in the county of Marion and State of Missouri, have invented new and useful Improvements in Wheat-Cleaning Machines, of which the following is a specification.

This invention relates to certain new and useful improvements in machines for cleaning wheat, and has for its general objects to provide a machine for this purpose of a novel construction wherein the grain, suitably moistened, will be subjected to thorough agitation in one compartment, and then be conveyed by a force feed device into another compartment where it is further subjected to agitation under controllable pressure, the pressure being produced by the force feed device, and the aujustment thereof by a yielding closure to the outlet.

The invention has for a further object to provide means for simultaneously admitting water and grain to the machine, and to control the amount of water admitted by the flow of grain, and to automatically cut off the supply coincident with the cessation of the flow of the grain.

Other objects of the invention relate to details of construction, and to combinations and arrangements of parts all as hereinafter more fully set forth.

In the accompanying drawings,—Figure 1 is a longitudinal sectional view of a machine constructed according to our invention; Fig. 2 is a cross sectional view thereof on the line 2—2 of Fig. 1, and viewed in the direction of the arrow; Fig. 3 is a cross sectional view on the line 3—3 of Fig. 1, and viewed in the direction of the arrow; Fig. 4 is a detail view on an enlarged scale of one end portion of one of the agitators; Fig. 5 is a view partly in side elevation and partly in section, and on an enlarged scale, illustrating the feeding arrangement; Fig. 6 is a view partly in end elevation and partly in section, of the parts shown in Fig. 5; Fig. 7 is a plan view of the parts shown in Fig. 5; and Fig. 8 is a bottom plan view of a portion of the inner side of the cover of the machine.

Referring now to these drawings, the numeral 1 indicates the casing of the machine, which in practice is about four feet in length, the bottom portion being semi-circular in cross section, and having perpendicular members 2 which support a top or cover 3.

The numerals 4 indicate the ends of the casing, to each of which is secured a casting 5 affording a bearing 6 and a standard 7, on which the machine is supported. The ends 4 are centrally apertured concentrically with the bottom portion of the casing, and projecting through these apertures and into the bearings 6 is a shaft 8 which extends longitudinally through the casing. Fixedly secured at the center of this shaft is a force feed device in the form of an auger 9 which is concentric with the semi-circular bottom portion, and is adapted to rotate at a distance of about one-half an inch therefrom. Mounted on the side walls 2 is a partition 10 which is provided with a semi-circular recess to surround the auger so as to provide with the bottom portion of the casing a circular space in which said auger rotates, and which, with said auger, serves to divide the casing into two chambers, one of which, at the left of the auger, as shown in Fig. 1 and indicated by the numeral 11, we term the agitating chamber, and the other of which, to the right of the auger and indicated by the numeral 12, we term the cleaning chamber. Mounted on the shaft 8 in the chamber 11 are a series of S-shaped agitators 13, which are arranged from left to right in a progressively advanced relation to each other about the shaft, and are designed to be rotated with their convex side foremost.

Similarly mounted on the shaft 8 in the chamber 12 are a series of agitators 14 which are similar in all respects to the agitators 13 except that in their outer end portions they are preferably provided with a plurality of apertures 15 for a purpose to be presently described. Both sets of agitators have their outer or convex face forwardly inclined, that is, inclined toward the right-hand end of the machine, as indicated more clearly at 16 in Fig. 4, so as to impart a slight forward movement to the grain as it is agitated. The top 3 of the casing is provided near one end with an opening 17 which is surrounded by a housing 18, to the top of which will, in practice, be connected a chute for conveying the grain to the machine. Extending through this housing and pivotally mounted in the side walls thereof is a rock-shaft 19 to which is fixedly secured at its upper end a swinging valve 20, the free end of which moves in proximity to a curved abutment 21 formed in the wall of the housing and terminating short of the bottom thereof, as shown in Fig. 5. The rock-shaft 19 has an arm 22 formed integral with, or fixedly secured to one end thereof, and projecting rearwardly therefrom, slidably mounted on which is a weight 23. By adjusting this weight on the arm 22 the weight of grain necessary to maintain the valve 20 in an open position, or removed from engagement with the abutment 21, may be varied, thus tending to regulate the feed of the grain, while the valve will tend to automatically close as the maximum flow of grain permitted by the adjustment decreases. This automatic action of the valve is utilized in controlling the flow of water to the grain through the mechanism now to be described. Mounted on the cover 3 and extending therethrough to communicate with the interior of the casing is a pipe 24 which is provided with a valve 25 operated by a handle 26 for controlling the flow of water therethrough. Mounted on a longitudinal extension 27 of this pipe is a housing 28 which has a port communicating with the pipe 27 and controlled by a gate-valve 29. The movement of this gate-valve 29 to open or close its port is effected through the medium of an arm 30 to the upper end of which is connected one end of a link 31, the opposite end of which is connected to a crank arm 32 provided on the opposite end of the rock-shaft 19 to that described as having the arm 22 attached thereto. The arrangement and adjustment of the parts described is such that as the free end of the valve 20 moves toward the lower end of the abutment 21 the gate-valve 29 will be lowered to close its port and thereby cut off the supply of water to the pipe 27, and when the grain valve 20 reaches the closed position the gate-valve 29 will cover its port and shut off the supply of water. Conversely, as the grain valve 20 opens, the gate valve 29 will be moved to uncover its port. In other words, the grain valve 20 and the gate-valve 29 move in unison so that the supply of water will be proportioned to the supply of grain to the casing, and will cease with the cessation of the flow of grain.

Near the opposite end of the casing to that just described, or the right-hand end in Fig. 1, there is provided in one of the walls 2 an opening 33 which is controlled by a door 34 hinged at its upper end, as indicated at 35. Extending outward from this door is a rod 36 on which is slidably mounted a weight 37 which may be secured thereon in adjusted positions by means of a set-screw 38. By moving this set-screw toward or from the door the amount of pressure of the grain in the chamber 12 necessary to open the same may be varied for a purpose to be presently described. Mounted on one end of the shaft 8 is a sprocket wheel 39 by means of which the shaft 8 and the agitators and auger mounted thereon may be revolved by a sprocket chain from any suitable source of power.

By referring to Fig. 5 it will be seen that by providing the curved abutment 21 the grain valve 20 will have to move a considerable distance before it can clear the lower end of this abutment to permit the feed of the grain, and by this means I provide for insuring the raising of the gate-valve 29 to start the flow of water before the feed of grain commences. The normal position of the grain valve 20 is substantially horizontal, and is determined by a stop 40 with which the upper side of the valve 20 is adapted to engage to limit its upward movement.

While the automatic valve mechanism described will provide for the feed of the water in proportion to the feed of the grain, additional means must be provided for proportioning the amount of water supplied to the grain, as some wheats will require more water than others. The adjustment of the amount of water to be supplied to the grain is effected by turning the handle 26 which controls the valve 25 to permit a greater or less amount of water to be supplied to the grain in the casing.

Assuming the proper adjustments of the valves to have been made, and the machine to be in motion, the operation is as follows: The grain continuously passes through the opening 17 into the agitating chamber 11 where it is supplied with water passing into said chamber through the pipe 24. It is at once subjected to the action of the agitators 13 which operate to thoroughly agitate the grains, and by such agitation insures that all of the grains shall be brought into contact with the water and thoroughly moistened, such agitation having also a scouring action and tending to loosen the outer hull of the grain. It should be stated that the amount of water supplied is in all cases just sufficient to thoroughly moisten the grains without leaving any free water in the casing. Coincident with the agitation of the grain there is a slight forward movement thereof toward the auger 9, which is slightly facilitated by reason of the inclination 16 of the working surface of the agitators. As the body of grain reaches the auger the latter continuously forces it into the cleaning chamber 12 where it is acted upon by the agitators 14.

In operation the chamber 12 will be filled with grain under pressure produced by the auger 9 and regulated by the adjustment of the resistance of the closure 34. By this means the individual grains are caused to rub against each other with more or less force while being continuously agitated by the members 14, and in this way the removal of the outer flaky coating with adhering dirt is materially facilitated. This operation is further assisted by the rubbing contact of the agitators 14, and by the passage of the grain through the openings 15 therein, in which latter movement the frictional contact of the grains with the walls and edges of said openings, tends to scrape said outer coating from the grains. When sufficient grain has been forced into the chamber 12 to produce the required degree of pressure, the door 34 will be forced open permitting the grain to flow out, and after this movement has started the flow will be continuous as long as the machine is in operation.

In addition to removing the outer hull from the grain we find that by the use of our invention the greater portion of the germ will also be removed from the wheat grains, which is a highly important result of the use of our invention.

To increase the frictional action we may provide the top of our casing with inwardly extending pyramidal projections 41, which, however, are common in this class of machines, and are not claimed specifically as of our invention. After the wheat passes through our machine it is allowed to dry and is then passed through other cleaning machines, such as are commonly employed in mills, in which the husk, dirt and germ removed from the grain in our machine, are separated therefrom by suction.

In actual operation we have found that wheat subjected to the action of our machine will have the outer husk and adhering dirt thoroughly removed therefrom, and after this refuse matter has been separated from the wheat in the well-known way the latter will be in an ideal condition for the subsequent milling operation.

We desire to emphasize the importance of the special shape of the agitator which we employ. A plurality of these agitators arranged as described and having flat, inclined working faces will yield a maximum of rubbing action on the grain, and will tend only slightly to feed the grain forward. This insures a thorough mechanical action on the grain, and a thorough rubbing of the grains against each other without any tendency to break the same.

In addition to cleaning the grain by attrition, we have found that the procedure followed in the use of our device consisting in simultaneously admitting water and grain in the first chamber and therein agitating the latter, results in thoroughly washing the grain, as well as tempering it. The use of our machine will therefore render unnecessary the employment of additional means or devices for accomplishing these objects.

We claim:

1. A wheat cleaning machine comprising a casing provided with an inlet and an outlet for grain and affording an uninterrupted space for the agitation of the grain in bulk, a shaft extending through said casing and provided with two sets of agitators, a force feed device mounted on said shaft and interposed between the two sets of agitators, and a yieldable closure for said outlet.

2. A grain cleaning device comprising a casing affording an uninterrupted space for the agitation of the grain in bulk and having an inlet and an outlet for grain located, respectively, at opposite ends of the casing, a shaft extending through said casing and provided with two sets of agitators, a force feed device mounted on said shaft between the two sets of agitators, a partition coöperating with said force feed device to divide the casing into two chambers, and a yieldable closure for said outlet.

3. A wheat cleaning device comprising a casing of substantially uniform dimension throughout and affording an uninterrupted space for the agitation of the grain in bulk, a shaft extending through the casing and provided centrally of the casing with an auger, a partition coöperating with said auger to divide the casing into two chambers, a set of agitators mounted on said shaft and located in one of said chambers, means for supplying grain and water to said chamber, a set of agitators mounted on said shaft and located in the other chamber and being similar in construction and arrangement to those in the first named chamber, said other chamber being provided with an opening, and a yieldable closure for said opening.

4. A wheat cleaning device comprising a casing affording an uninterrupted space for the agitation of the grain in bulk, a shaft extending through said casing and provided with two sets of curved agitators, an auger mounted on said shaft between the two sets of agitators, means coöperating with said auger for dividing the casing into two chambers, each containing a set of agitators, said casing having an inlet and an outlet for grain located, respectively, at opposite ends thereof, and said outlet having a yieldable closure.

5. A wheat cleaning device comprising a casing affording space for the agitation of grain in bulk and having at one end an inlet for grain and an inlet for water, automatic means for controlling the flow of water from the flow of grain, a shaft extending through said casing and provided with two sets of agitators, a force feed device mounted on said shaft between the two sets of agitators, said casing having an outlet opening provided at its opposite end, and a yieldable closure for said opening.

6. A wheat cleaning device comprising a casing affording space for the agitation of grain in bulk and having at one end an inlet for grain and an inlet for water, automatic means for controlling the flow of water from the flow of grain, adjustable means for determining the amount of water to be delivered to the grain, a shaft extending through said casing and provided with two sets of agitators, a force feed device mounted on said shaft between the two sets of agitators, said casing having an outlet opening provided at its opposite end, and a yieldable closure for said opening.

In testimony whereof, we have hereunto set our hands in presence of two subscribing witnesses.

ORLANDO M. FRIEND.
SAMUEL E. FRIEND.

Witnesses:
JOSEPH M. RICHARDS,
CHARLES R. MAHAN.